Feb. 7, 1961 W. M. BETTS 2,970,849
SPRING MUD FLAP HOLDERS
Filed May 7, 1958
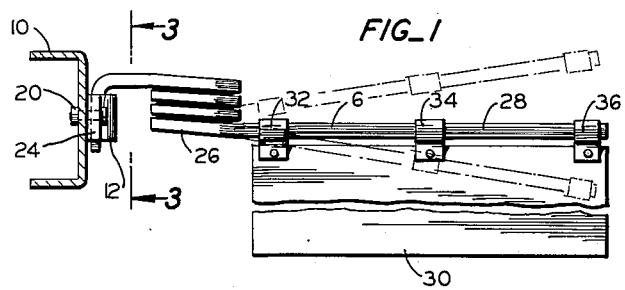
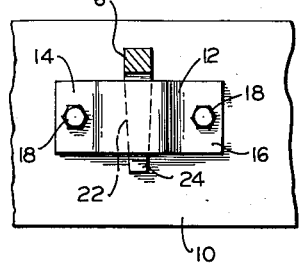
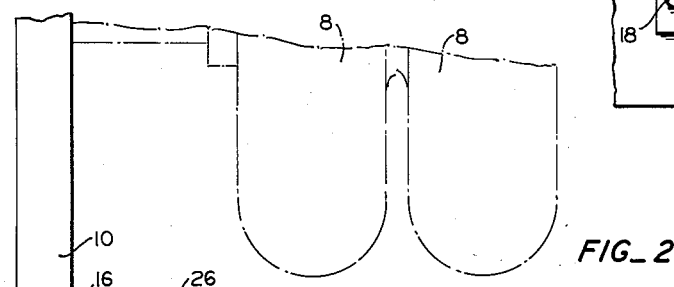
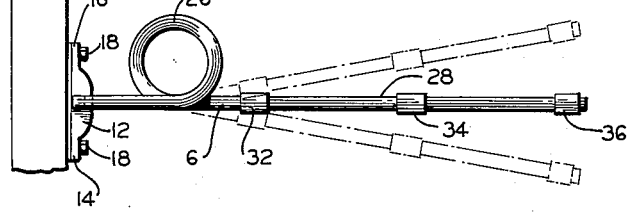
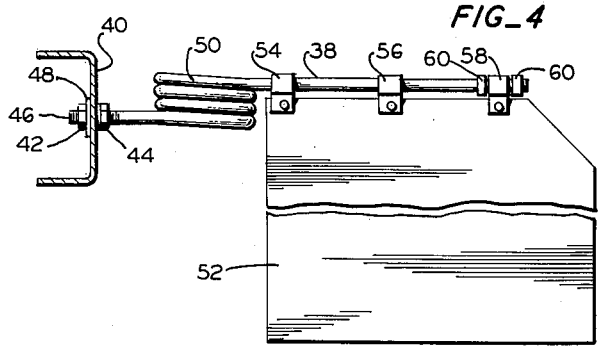
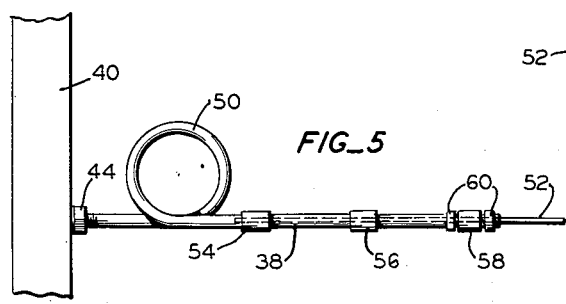
INVENTOR.
WILLIAM MICHAEL BETTS
BY Naylor & Neal
ATTORNEYS United States Patent Office 2,970,849
Patented Feb. 7, 1961

2,970,849

SPRING MUD FLAP HOLDERS

William M. Betts, 868 Folsom St., San Francisco, Calif.

Filed May 7, 1958, Ser. No. 733,709

5 Claims. (Cl. 280—154.5)

This invention relates in general to mud flap holders and more particularly to a mud flap holder utilizing a spring which permits resilient flexure of the holder.

It is an object of this invention to provide a mud flap holder of simple design, light weight and low cost adapted for use on most trucks presently utilized in highway hauling.

It is a further object to provide a mud flap holder which is capable of resilient flexure to prevent damage to the holder and to the flap carried thereby upon impact with obstructions.

A still further object is to provide a mud flap holder of the character described which is adapted for permanent or removable installation upon a truck chassis and which, when installed for easy removal, is physically and functionally interchanegable with similar units on the same or other trucks.

Further objects and advantages of this invention will become apparent from the following description taken in conjunction with the drawing forming a part of this specification in which:

Figure 1 is a view in rear elevation showing the mud flap holder of this invention installed upon the chassis of a truck for easy removal, the approximate limits of flexure being indicated in phantom outline.

Figure 2 is a view in plan of the holder of Figure 1 shown positioned adjacent to the wheels of a truck with the approximate limits of flexure being shown in phantom outline.

Figure 3 is a view in section taken on the line 3—3 of Figure 1.

Figure 4 is a view in rear elevation of a modification of the invention showing the flap holder permanently secured to a truck chassis.

Figure 5 is a view in plan of the mud flap holder of Figure 4.

In Figure 1 is shown the mud flap holder 6 secured adjacent and to the rear of truck wheels 8 for easy removal from the longitudinal channel member 10 of a truck chassis through use of a bracket 12. The bracket 12 is secured to the channel member 10 through flanges 14 and 16 and a pair of bolts 18 and nuts 20. The bracket 12 is provided with a tapered channel 22 for the receipt of the downturned tapered end support member 24 of the mud flap holder 6 in wedge fitting relationship, the downturned end member 24 of the holder being of slightly less taper than the channel.

The mud flap holder 6, as illustrated, is formed of steel square bar stock, although other suitable material may be used. The square bar stock, however, is particularly satisfactory in conjunction with the bracket means of support in preventing rotation of the tapered end member 24 of the holder 6 in the bracket channel 22. A spring 26 of helical shape is formed interjacent the secured tapered end member 24 and the elongated unsecured outer end or mud flap support member 28 which latter extends laterally outward a substantial distance beyond the body of spring 26 to impose with flexure a non-axial load thereon as described below. Spring 26, which may conveniently be formed integrally with members 24 and 28 from a single piece of stock, is disposed to sustain substantially nonaxial loading upon flexure of the holder which flexure results primarily from impact of member 28 with various obstructions. As illustrated in Figure 2, with forward or rearward movement of holder end member 28 and the mud flap 30 carried in depending relationship therefrom, a load in the form of a couple is imposed upon spring 26 which acts about the spring axis tending to coil or uncoil the spring. It should be noted that although the forward movement of member 28 tends to cause a coiling of spring 26 and a rearward movement an uncoiling thereof with member 28 and spring 26 arranged as in Figure 2, the direction of the coiling of spring 26 may be reversed if desired with the forward and rearward movements of member 28 then having an opposite effect upon the tendency toward coiling or uncoiling of said spring.

It is the resilience of spring 26 in permitting temporary yielding of the holder to impact, which prevents a permanent deformation or set in the holder and effects its spring-back into normal position upon withdrawal of the impact load. Inasmuch as the mud flap holder 6 may be subjected to variously directed impacts it is essential that the flap supporting end member 28 be permitted not only a forward and rearward movement as in Figure 2, but also an up and down movement as in Figure 1, the end member 28 thus being permitted universal resilient flexure. With up and down movement of flap supporting end member 28, spring 26 is subjected to a bending moment permitting holder 6 to temporarily yield to impact loads springing the holder back to normal position after removal of such loads. Although the tapered end member 24 is shown as an extension of the upper portion of the spring with the elongated outer end member 28 disposed therebelow, such arrangement is one of convenience of installation only, and may be reversed if desired. The mud flap 30 which is of a flexible material such as rubber, is secured to the holder 6 through use of clips 32, 34 and 36 riveted or otherwise secured to the top of the flap and hingedly carried by the elongated outer end member 28 of the holder. The outermost clip 36, adjacent the end of the holder 6, is welded thereto to secure the flap against detachment from the holder. It will be noted that the helical spring 26 is mounted with its axis extending vertically with the opposed axial ends of the spring disposed at the top and bottom of the spring. As illustrated in Fig. 1, the spring support member 24 is connected to the top axial end of the spring, and the mud flap support member 28 is connected to the bottom axial end of the spring. These connections of the members 24 and 28 to the opposed axial ends of the spring are reversed in Fig. 4.

The modified mud flap holder 38 of Figures 4 and 5 is secured to the longitudinal truck chassis channel member 40 through use of lock nuts 42 and 44 threadedly secured to the threaded end 46 of the holder 38. A back-up plate 48 is provided between lock nut 42 and the web of channel member 40 to prevent web distortion.

The modified holder 38, like holder 6 previously described, utilizes a helical spring 50 although, unlike holder 6, it makes use of round stock inasmuch as no problem of holder rotation is present in this particular means of securing the mud flap holder to the truck chassis. The flexible mud flap 52 is secured through clips 54, 56 and 58 with collars 60 being secured to the end of the holder, as by welding, to retain the flap in position.

From the foregoing description it is apparent that the mud flap holder of this invention is a practical unit of simple design which may be easily fabricated at reasonable cost. As indicated in Figures 1 and 2, the spring means permits universal flexure of the holder, i.e., in both vertical and horizontal planes, enabling the holder to yield upon encountering obstructions thereby preventing a permanent bending of the holder. Further, the means of mud flap holder support utilized in Figures 1, 2 and 3 permits easy interchangeability of the holders, when desired, from one position to another upon a truck or between trucks having bracket support arrangements of similar size and shape.

It will be appreciated that the embodiments of this invention as described above may be altered, changed or modified without departing from the spirit or scope of the invention as herein claimed.

What is claimed is:

1. A mud flap for attachment to trucks and the like comprising a helical spring having opposed axial ends, a spring support member disposed at one of said axial ends of said spring and adapted for securing said spring to a vehicle to fix said mud flap in operative position adjacent a wheel of said vehicle, a mud flap support member rigidly secured to said spring at the other of said axial ends and supported solely by said spring, and a mud flap supported solely by said mud flap support whereby said mud flap is supported for universal flexure circumferentially and axially of said spring.

2. A mud flap of claim 1 characterized further in that said spring support member is shaped to mount said spring on said vehicle with the axis of said spring in a generally vertical position, and said mud flap support extends generally tangentially and horizontally from said spring.

3. A mud flap of claim 2 characterized further in that said spring support member and said mud flap support member both extend tangentially from said spring and extend from axially aligned points on said spring whereby said spring provides a greater force opposing flexure of said mud flap in a vertical plane than the force opposing flexure of said mud flap in a horizontal plane.

4. A mud flap holder for trucks and the like comprising a helical spring having opposed axial ends, a mud flap support member rigidly secured to one of said axial ends of said spring and supported for universal flexure solely by said spring, and a spring support member secured to the other axial end of said spring and adapted for securing said spring to a vehicle with said mud flap support member and said spring support member in generally horizontal positions adjacent to a wheel of said vehicle.

5. A mud flap for trucks and the like comprising a helical spring having opposed axial ends, a support member secured to one of said axial ends of said spring and adapted for securing said spring to a vehicle with the axis of said spring in a generally vertical position, and a mud flap support member rigidly secured to the other axial end of said spring and supported solely by said spring with said mud flap support member extending from said spring in a horizontal direction generally perpendicular to said axis of said spring.

References Cited in the file of this patent

UNITED STATES PATENTS

| | | |
|---|---|---|
| 1,805,933 | Victor | May 19, 1931 |
| 2,038,234 | Olen | Apr. 21, 1936 |
| 2,640,714 | Garner et al. | June 2, 1953 |
| 2,660,453 | Russell et al. | Nov. 24, 1953 |

FOREIGN PATENTS

| | | |
|---|---|---|
| 226,859 | Great Britain | Jan. 8, 1925 |